J. JOHNSON.
DRAG SAW.
APPLICATION FILED SEPT. 21, 1918.
1,303,561.
Patented May 13, 1919.
2 SHEETS—SHEET 1.
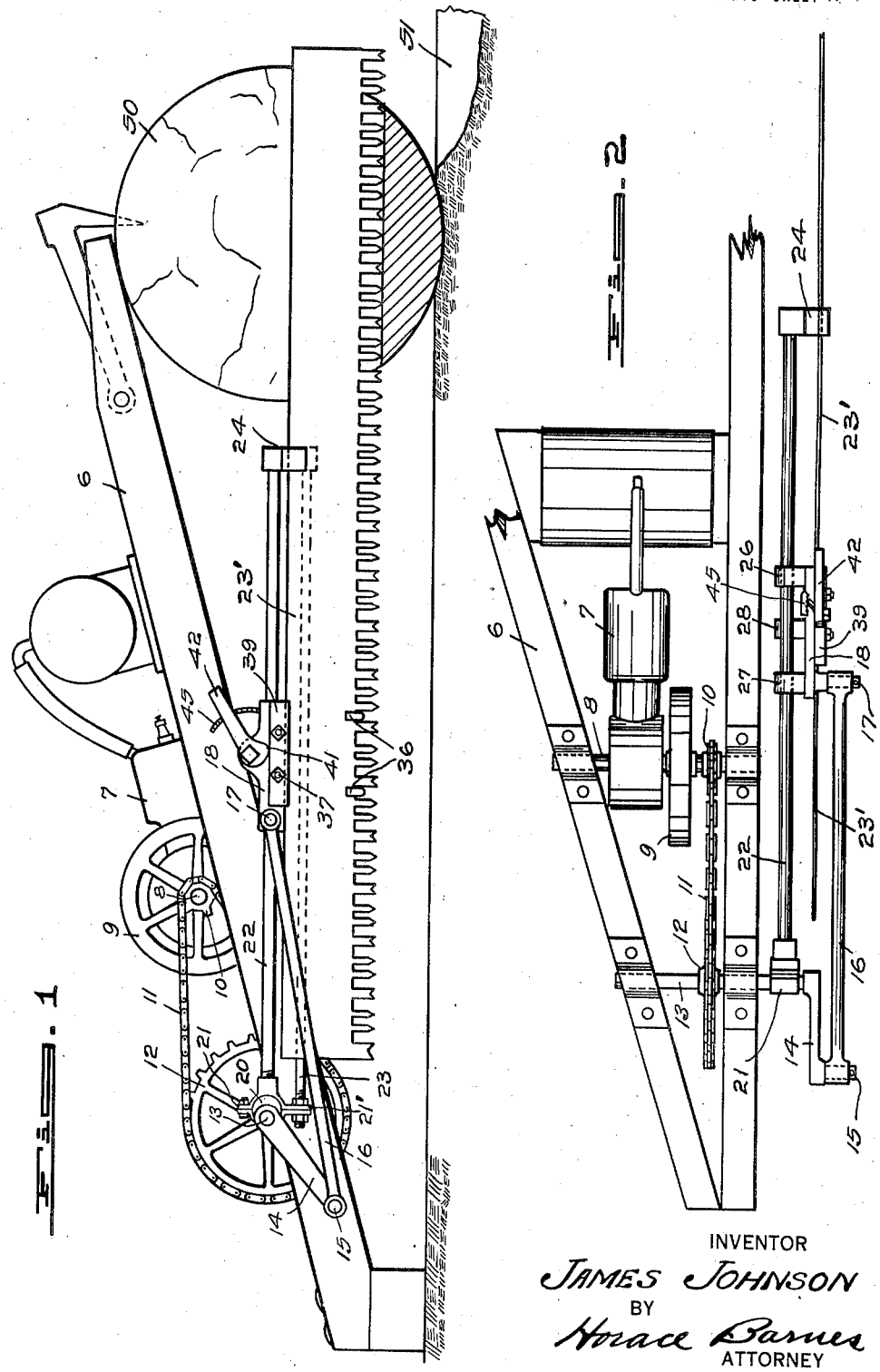
INVENTOR
JAMES JOHNSON
BY
Horace Barnes
ATTORNEY

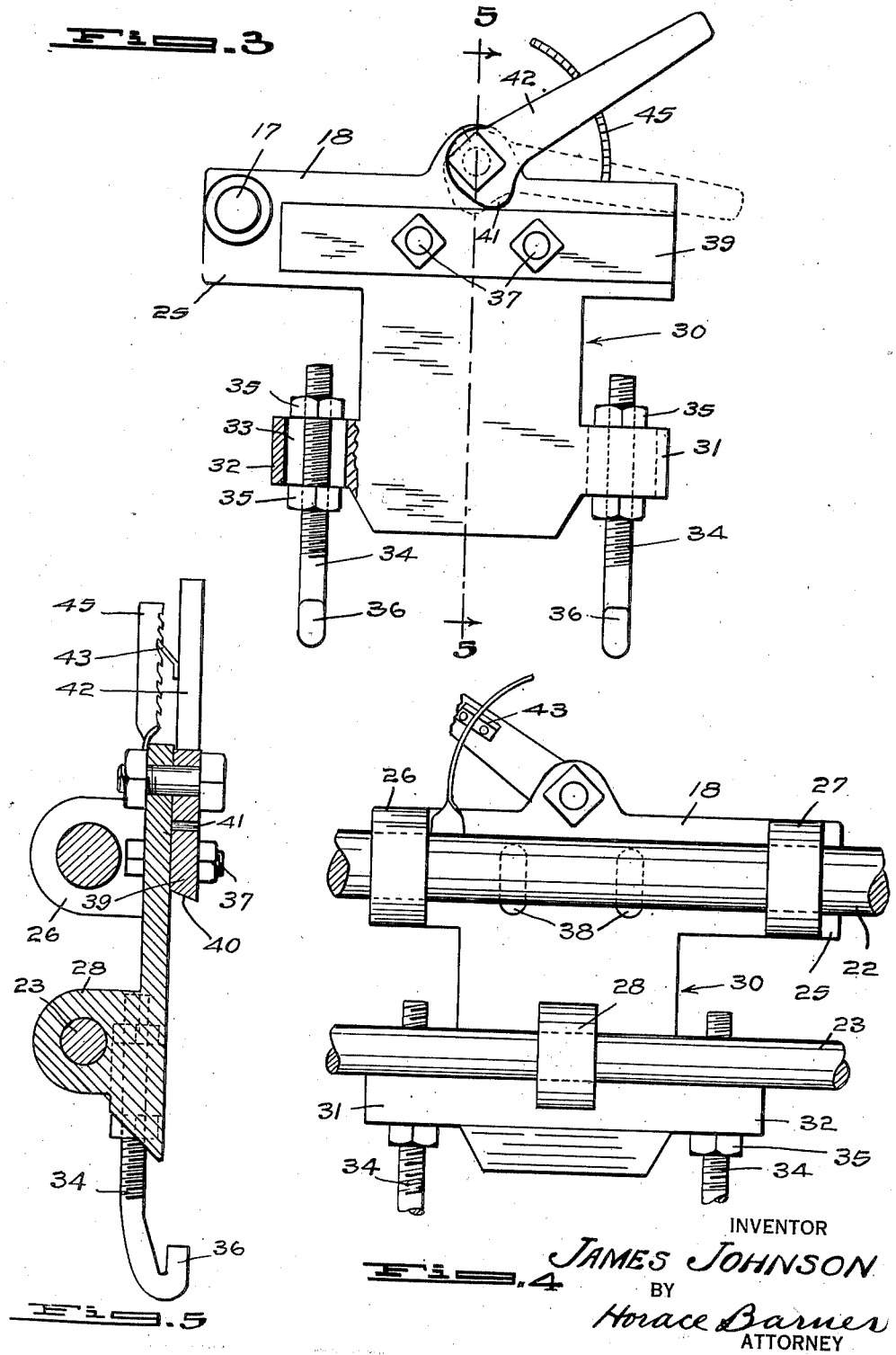

UNITED STATES PATENT OFFICE.

JAMES JOHNSON, OF O'BRIEN, WASHINGTON.

DRAG-SAW.

1,303,561.　　　　　Specification of Letters Patent.　　Patented May 13, 1919.

Application filed September 21, 1918.　Serial No. 255,107.

*To all whom it may concern:*

Be it known that I, JAMES JOHNSON, a citizen of the United States, residing at O'Brien, in the county of King and State of Washington, have invented certain new and useful Improvements in Drag-Saws, of which the following is a clear and exact specification.

This invention relates to improvements in power actuated portable drag saws of the type that are adapted to be moved from place to place in the woods to saw up timber that is to be cut into smaller pieces and that can not be easily moved to the saw.

The object of this improvement is to provide a drag saw of this class having a saw holding device that is adapted to grip the saw at any point so that the saw may be adjusted lengthwise through the saw holding device to thereby vary the length of that portion of the saw that projects forwardly from the saw holding device.

This object is attained by means of a novel re-arrangement of certain parts that are old and well known in drag saws now in common use and by the provision of a new and novel form of saw holding device acting in conjunction with such re-arranged parts.

The invention consists in the novel construction, adaptation and combination of parts of a drag saw as will be more clearly hereinafter described and claimed.

In the accompanying drawings Figure 1 is a side elevation of a drag saw constructed in accordance with my invention. Fig. 2 is a plan of the same certain parts being broken away. Fig. 3 is an enlarged front elevation of a saw holding device that is adapted to clamp the saw at any point through its length. Fig. 4 is a rear elevation of the device shown in Fig. 3; and Fig. 5 is a vertical section substantially on a broken line 5—5 of Fig. 3.

In sawing up logs in the forest it is often difficult, owing to the presence of stumps, fallen timber, uneven ground and the like, to position the frame of the ordinary drag saw so that the end of the saw blade that projects through the log will clear obstructions such as other logs, stumps, trees, or banks of earth to the rear of the log that is being sawed, the drag saw blade of normal length having a tendency to strike against any obstruction that is near the log that is being sawed. The present invention makes the effective length of the drag saw blade variable and thereby often enables the sawyer to saw up logs that he would otherwise have to leave unsawed or to saw logs without moving them where they would otherwise have to be moved.

Referring to the drawings, in which like reference numerals designate like parts, the numeral 6 designates a triangular frame upon which is mounted an engine 7 that is adapted to drive a shaft 8 whereon is provided a fly wheel 9.

The shaft 8 is provided with a suitable sprocket pinion 10 that is connected by a sprocket chain 11 with a large sprocket wheel 12 on a transverse shaft 13. Secured upon the outer end of the shaft 13 is a crank arm 14 having a crank pin 15 that is connected by a pitman rod 16 with a suitable pivot stud or pin 17 on a saw holding device 18.

20 is an eccentric secured to the shaft 13 between the sprocket wheel 12 and crank arm 14 and normally encircled by plates 21 that are connected with guide rods 22 and 23, the guide rod 22 being substantially radial with respect to the shaft 13; rod 23 being secured to the lower projecting portion 21′ of the encircling plates 21 and being disposed below the guide rod 22.

The eccentric is for the purpose of giving a tilting or rocking motion to the saw to facilitate clearing the saw dust from the cut made by the saw.

All of the above parts in themselves are old and well known in the art of drag saws, but by the re-arrangement of these parts and the provision of a new and novel form of saw holder 18 I am enabled to effect a construction that will permit the end of a saw 23′ to project rearwardly through the saw holder 18 and to be adjustably held by the saw holder so that the effective length of that portion of the saw which projects beyond the saw holder may be varied.

The guide rods 22 and 23 will preferably be connected at their outer ends with a guide member 24 that is adapted to fit over the top of the saw in the usual manner to serve as a guide and support.

The saw holder 18 comprises a plate as more clearly shown in Figs. 3, 4 and 5 having a longitudinal projection 25 on its upper end to which the pivot pin 17 is secured, and provided on its rear side adjacent the top edge with two perforated lugs 26 and 27 through which the guide rod 22 is adapted to slide and at a point lower down and near the center of the plate with another perforated lug 28 through which the lower guide rod 23 is adapted to slide.

The medial portion of the saw holder 18 is narrowed as at 30 and the lower part of the narrowed portion 30 is formed with two lugs 31 and 32 that project sidewise therefrom and are provided with vertically arranged slotted holes 33 through which the upper ends of hook bolts 34 are adapted to project, the bolts 34 being adjustably secured within the holes 33 by nuts 35.

The hook bolts 34 are each provided on their lower ends with a hook 36 that projects forwardly and upwardly and hooks between the teeth of the saw 23 as more clearly shown in Fig. 1.

Secured upon the front surface of the saw holder 18 adjacent the upper edge thereof by bolts 37 that pass through slotted holes 38 is a saw clamping device 39 that is provided with an angular or beveled bottom edge 40 adapted to engage with the top edge of the saw 23', the slotted holes 38 permitting the saw clamping device 39 to adjust itself so that it will make contact throughout its entire length with the top edge of the saw.

The saw clamping device 39, is adapted to be forced downwardly against the top edge of the saw by a cam 41 that is formed integral with a lever arm 42 having a catch or blade like member 43 that is adapted to engage within suitable notches in a quadrant 45 that is secured to the saw holder 18 and projects upwardly therefrom.

If desired the quadrant 45 may be dispensed with and the cam 41 may be used to force the saw clamping device 39 tightly down on the top of the saw and such clamping device may then be rigidly secured in place by tightening the nuts on the bolts 37 before the pressure of the cam is released.

It is also possible to adjust the hook bolts 34 so that the cam lever 42 may be thrust downwardly onto the top of the saw clamping device 39 as shown by dotted lines in Fig. 3 thereby causing the cam 41 to slightly pass center, in which position it will effectively maintain the pressure of the clamping device 39 on the top of the saw.

It will be noticed that the cam 41 is so located as to exert a downward pressure on the top of the saw clamping member 39 approximately midway between its two ends, thereby causing such clamping member to automatically adjust itself and exert a pressure throughout its entire length on the top edge of the saw.

The face of the saw holding device 18, is a plane surface as more clearly shown in Fig. 5, so that the saw will lie flatly against such surface, the hook bolts 34 being disposed back of the saw and the hooks 36 extending outwardly and over the lower edge of the saw between the saw teeth.

The slotted holes 33 in the lugs 31 and 32 permit the hook bolts 34 to be moved toward or away from each other in adjusting them to fit between saw teeth of a different size or between the teeth on saws of a different type.

In sawing up logs 50 in the forest it is often a very decided advantage to be able to vary the effective length of the saw by clamping the saw within the saw holder 18 at different points, for instance, if the log 50 that is to be sawed lies close to another log the saw may be clamped within the saw holder 18 at a distance from its end and thereby shorten the effective length of that portion of the saw that projects outwardly from the saw holder 18 so that in its rearward movement the saw will not project far enough through the log 50 that is being sawed to come in contact with the objects to the rear of such log.

It will also be apparent that when the last part of the cut through a log 50 is being made the saw 23 will assume a downwardly inclined position and the outer end of such saw will tend to dig into the ground. For this reason a trench as indicated by the numeral 51 in Fig. 1 is ordinarily dug on the side of the log removed from the saw. If the saw projects a long distance through the log the trench will necessarily be longer, the outer end of the trench being deeper than the end next to the log. For this reason it is often advantageous to shorten the effective length of the saw especially where the ground to the rear of the log 50 slopes upwardly, thereby obviating the necessity of digging long and deep trenches to prevent the saw from running into the ground.

It will be obvious that changes in the precise form of construction of the various parts of this device may be made within the scope of the following claims.

What I claim is—

1. A drag saw of the class described comprising a saw holding device, guide rods therefor, a pitman for reciprocating said saw holding device and a saw adjustable lengthwise within said saw holding device to increase or decrease the length of that portion of the saw that projects forwardly from said saw holding device.

2. A drag saw of the class described comprising a saw holding device, guide rods therefor, a pitman for reciprocating said saw holding device, the point of connection of said pitman with said saw holding device being above the plane of the top edge of the saw, and a saw adjustable lengthwise within said saw holding device whereby the length of that portion of the saw that projects forwardly from said saw holding device may be varied the rear end portion of said saw being arranged in the space between said guide rods and said pitman.

3. In a drag saw of the class described the combination with a driven shaft, of a crank arm provided thereon, a saw holding device, a saw adjustable lengthwise within said saw holding device, a pivot pin projecting from said saw holding device above the plane of the top edge of the saw, a pitman connecting said pivot pin with the outer end of said crank arm for reciprocating said saw holding device, an eccentric on said driven shaft, two guide rods secured to said eccentric one above another, said saw holding device being slidable on said guide rods and the rear end of said saw being arranged in the space between said guide rods and said pitman the uppermost guide rod projecting radially from said driven shaft and the top edge of the saw being slightly below said uppermost guide rod.

4. A saw holding device comprising a plate, a saw clamping bar extending across the upper portion thereof, bolts securing said saw clamping bar to said plate, the latter having vertical slots through which said bolts pass, a pivot stud projecting from the face of said plate above the plane of the bottom edge of said saw clamping bar, means for exerting a downward pressure on said saw clamping bar and hook bolts projecting downward from said plate and having hooks adapted to engage between the teeth of a saw, said bolts being adjustable both in a vertical and sidewise direction.

5. In a drag saw the combination with a frame, of a driven shaft, a crank on said shaft, guide bars connected with said shaft, a reciprocable pitman connected with said crank, a saw holding device connected with said pitman said saw holding device comprising a plate having a flat front surface, a lug projecting sidewise from each edge of the lower portion of said plate said lugs having slotted holes therein, hook bolts extending in vertical directions through said slotted holes and each provided with nuts above and below said lugs whereby they may be adjusted vertically and sidewise, hooks on the lower ends of said hook bolts adapted to hook between the teeth of a saw, a saw clamping bar having an inclined bottom edge adapted to engage the top edge of a saw, bolts securing said bar to said plate the holes in said plate through which said bolts pass being slotted vertically, a cam lever pivotally mounted on the upper portion of said plate and adapted to exert a downward pressure on said bar, means for holding said cam lever and a pivot stud projecting from the face of said plate above the plane of the lower edge of said saw clamping bar.

6. In a drag saw the combination with a frame, of a driven shaft mounted thereon, guide bars connected with said shaft, a reciprocable pitman driven by said shaft, a saw holding device connected with said pitman, said saw holding device comprising a plate having a flat front surface, two lugs projecting rearwardly from the upper edge of said plate and having alined perforations, a perforated lug projecting from the rear side of said plate below said first named lugs, a lug projecting sidewise from each edge of the lower portion of said plate said lugs having slotted holes therein, hook bolts extending in vertical directions through said slotted holes and each provided with nuts above and below said lugs whereby they may be adjusted vertically and sidewise, hooks on the lower ends of said hook bolts adapted to hook between the teeth of a saw, a saw clamping bar having an inclined bottom edge adapted to engage the top edge of a saw, bolts securing said bar to said plate the holes in said plate through which said bolts pass being slotted vertically, a cam lever pivotally mounted on the upper portion of said plate and adapted to exert a downward pressure on said bar, means for holding said cam lever and a pivot stud projecting from the face of said plate above the plane of the lower edge of said saw clamping bar.

Signed at Seattle, Washington, this 14th day of September, 1918.

JAMES JOHNSON.